(12) United States Patent
Brhel et al.

(10) Patent No.: US 12,026,158 B2
(45) Date of Patent: *Jul. 2, 2024

(54) SYSTEM AND METHOD FOR REDUCING WAIT-TIME IN A MULTICHANNEL CONTACT CENTER

(71) Applicant: inContact INC., Sandy, UT (US)

(72) Inventors: Damian Brhel, Pruhonice (CZ); Rahul Vyas, Rajasthan (IN); Salil Dhawan, Pune (IN)

(73) Assignee: inContact INC.

( * ) Notice: Subject to any disclaimer, the term of this patent is extended or adjusted under 35 U.S.C. 154(b) by 0 days.

This patent is subject to a terminal disclaimer.

(21) Appl. No.: 18/144,209

(22) Filed: May 7, 2023

(65) Prior Publication Data
US 2023/0281198 A1 Sep. 7, 2023

Related U.S. Application Data

(63) Continuation of application No. 17/673,840, filed on Feb. 17, 2022, now Pat. No. 11,657,049.

(51) Int. Cl.
*G06F 16/2453* (2019.01)
*G06Q 10/0633* (2023.01)

(52) U.S. Cl.
CPC ... *G06F 16/24534* (2019.01); *G06Q 10/0633* (2013.01)

(58) Field of Classification Search
CPC ............ G06F 16/24534; G06Q 10/0633
See application file for complete search history.

(56) References Cited

U.S. PATENT DOCUMENTS

| | | | |
|---|---|---|---|
| 10,666,806 B1* | 5/2020 | Cordon | H04M 3/5238 |
| 2006/0294058 A1* | 12/2006 | Zabback | G06F 16/2462 |
| 2016/0034406 A1* | 2/2016 | Hansson | G06F 13/1663 711/151 |
| 2018/0143975 A1* | 5/2018 | Casal | G06F 40/51 |

* cited by examiner

Primary Examiner — Richard L Bowen
Assistant Examiner — Aryan D Toughiry
(74) Attorney, Agent, or Firm — SOROKER AGMON NORDMAN RIBA (57) ABSTRACT

A computerized-method for reducing wait-time in a multi-channel-contact-center. For each query that is not resolved by a bot: a. selecting a digital-channel-type from a plurality of digital-channel-types; b. operating an aggregator module on the selected digital-channel-type to aggregate the received query and similar pending queries into a group-of-queries; c. operating a tracker-module on the group-of-queries to identify a query-resolution and to send a notification as to the query-resolution to the customer via the digital-channel-type that the query has been received; and d. repeating operations a.-c. until a query-resolution has been identified or all digital-channel-types in the plurality of digital-channel-types have been selected.

15 Claims, 10 Drawing Sheets

240 — when a total parking period of the plurality of digital-channel-types is lower than an expected wait-time of the received query and the received query hasn't been resolved, repeating operations 210 – 230 until a query-resolution has been identified or all digital-channel-types have been selected

| Parking Id | Originator channel | Engaged channel | Query | Parking period | Query Resolution |
|---|---|---|---|---|---|
| P1 | C1 | C4 | Q1 | PT1 | Parked |
| P2 | C1 | C2 | Q1 | PT2 | Parked |
| P3 | C1 | C3 | Q1 | PT3 | Resolved |

Figure 5A $$\frac{[1 \ 2 \ 3 \ 4 \ 5 \ 6 \ 7 \ 8 \ 9] * ([0.8 \ 0.9 \ 0.8 \ 4 \ 5 \ 6 \ 7 \ 8 \ 9])^T}{\sqrt{1*1+2*2+3*3+4*4+\cdots+9*9} * \sqrt{0.8*0.8+0.9*0.9+0.8*0.8+4*4+\cdots+9*9}}$$

$$\frac{1*0.8+2*0.9+3*0.8+4*4+5*5+6*6+7*7+8*8+9*9}{16.8 * 16.5}$$

$= 0.9956 \approx 99.56 \%$ *of similarity between two queries*

→ The numerator part will be matrix multiplication between 1\*9 matrix and 9\*1 matrix (by taking transpose of the other matrix for matrix multiplication)

→ Denominator calculation by using $\|S\| = \sqrt{\sum_{i=1}^{i=n} x_i^2}$ formulae.

SYSTEM AND METHOD FOR REDUCING WAIT-TIME IN A MULTICHANNEL CONTACT CENTER

RELATED APPLICATIONS

This application claims priority as a continuation of U.S. application Ser. No. 17/673,840 dated Feb. 17, 2022, the disclosure of which is incorporated herein by reference in its entirety.

TECHNICAL FIELD

The present disclosure relates to the field of data analysis and more specifically to reducing customers wait-time in a multichannel contact center.

BACKGROUND

A study shows that in 2018, 98% of callers to customer service departments and contact centers were willing to wait for 75 seconds or more for their call to be connected. However, in 2021, 54% of these callers would disconnect, even though wait times had nearly halved. So, consistently reducing wait-time for an interaction is of topmost priority for a contact center.

As per Customer Experience Trends 2020 Report of Zendesk, a company that provides software-as-a-service products, nearly 60% of customers feel that a long wait-time is the most frustrating aspect of any service experience.

Customer satisfaction may be increased due to optimized multichannel support, reduced wait-time and low abandonment rate. Consequently. Net Promoter Score (NPS), a popular metric used to measure customer loyalty and satisfaction, may show a marked improvement. For a contact center, an average of NPS growth of 7% correlates with a 1% growth in revenue. Poor customer service is costing businesses more than $75 billion a year, according to a report from NewVoiceMedia. Just a 5% lift in customer retention can boost a company's profitability by as much as 75%, according to a management consulting firm, Bain & Company.

Today organizations are moving towards agnostic digital channels offering, as the customer chooses channel of preference to approach the contact center. Nowadays, when a customer asks a query via a particular channel type, e.g., Viber, then when for example, the query resolution-time is too long via this particular channel type, the customer may send the same query, over other channel types to speed up resolution time, which results in increased wait-time in the queues of the different channel types.

Furthermore, from time to time, a similar query may have been asked on different channel types by another customer, which may be utilized to answer the query of the customer. Hence, there is a need for a technical solution for reducing query wait-time in a multichannel contact center by aggregating similar queries and providing a resolution once one of the queries is resolved to all other queries via the shortest digital-channel-type. Thus, providing a faster resolution to one or more customer queries without hampering customer experience.

SUMMARY

There is thus provided, in accordance with some embodiments of the present disclosure, a computerized-method for reducing wait-time in a multichannel contact center.

Furthermore, in accordance with some embodiments of the present disclosure, in a system that is supporting inbound-interactions via a plurality of digital-channel-types, said system comprising: one or more processors, a plurality of queue-databases having a queue-database for each digital-channel-type and a memory to store the plurality of queue-databases thereon, for each query received by a customer via a digital-channel-type and not resolved by a bot, said one or more processors operate a Channel Agnostic Queuing (CAQ) module.

Furthermore, in accordance with some embodiments of the present disclosure, the CAQ module may include: a. selecting a digital-channel-type from the plurality of digital-channel-types in a predetermined order; b. operating an aggregator module on the selected digital-channel-type to: (i) identify one or more similar pending queries in a queue-database related to the digital-channel-type; and (ii) aggregate the received query and the identified one or more similar pending queries into a group-of-queries; c. operating a tracker module for a calculated parking period on the group-of-queries to identify a query-resolution and to send a notification as to the query-resolution to the customer via the digital-channel-type that the query has been received and to related customers of the identified similar pending queries each via a related digital-channel-type; and d. when a total parking period of the plurality of digital-channel-types is lower than an expected wait-time of the received query and the received query hasn't been resolved, repeating steps a.-c. until a query-resolution has been identified or all digital-channel-types have been selected.

Furthermore, in accordance with some embodiments of the present disclosure, the predetermined order of the selecting of the digital-channel-type from the plurality of digital-channel-types may be configured to have a digital-channel-type via which the query has been received as first and then other digital-channel-types in ascending order based on a calculated parking period related to each digital-channel-type.

Furthermore, in accordance with some embodiments of the present disclosure, the total parking period may be determined by aggregating the calculated parking period of each digital-channel-type in the plurality of digital-channel-types.

Furthermore, in accordance with some embodiments of the present disclosure, the identifying of the query resolution by the tracker module may include checking when at least one query of the group-of-queries has been resolved.

Furthermore, in accordance with some embodiments of the present disclosure, the received query may be resolved via a digital-channel-type different from the first digital-channel-type by: (i) an agent of the digital-channel-type different from the first digital-channel-type; or (ii) a query of the group-of-queries in the digital-channel-type different from the first digital-channel-type has been resolved.

Furthermore, in accordance with some embodiments of the present disclosure, the QSS of each pending query may be calculated based on feature vectors which are generated from processing sentences in the received query and in the pending query, and the processing is operated by using at least one of Neuro Linguistic Programming (NLP) techniques to convert each query into a feature vector: (i) Term Frequency—Inverse Document Frequency (TF-IDF) methods; or (ii) word2Vec technique; or (iii) Smooth Inverse Frequency (SIF).

Furthermore, in accordance with some embodiments of the present disclosure, when the NLP technique is TF-IDF, the QSS of each pending query may be calculated by formula I:

$$S_i = \frac{S_{LT} \cdot S_{ST}}{\|S_{LT}\|\|S_{ST}\|} \quad (I)$$

whereby:
$S_i$ is Query Similarity Score,
$S_{LT}$ is a feature vector of the received query, and
$S_{ST}$ is a feature vector of a pending query.
$\|S_{LT}\|$ and $\|S_{ST}\|$ is calculated based on formula II:

$\|S\| = \sqrt{\Sigma_{i=1}^{i=n} x_i^2}$ where $x_i$ is an element from the feature vector.

Furthermore, in accordance with some embodiments of the present disclosure, the expected wait-time of the received query may be determined by formula III:

$$\text{wait-time} = \Sigma_{i=1}^{N-1} Q * Ti \quad (III)$$

whereby:
T is a waiting period per query that is retrieved from the queue-database of the received query,
N−1 is a number of total queries which is ahead of queue from the received query, and
Q is a queue size which is a number of queries in the queue-database of the received query.

Furthermore, in accordance with some embodiments of the present disclosure, the parking period in each digital-channel-type may be calculated by formula (IV):

$$\text{parking period} = \text{wait-time}/(C*Q) \quad (IV)$$

whereby:
C is a number of digital-channel types, and
Q is queue size of a queue-database related to the digital-channel-type, and
wait-time is the expected wait-time of the received query.

Furthermore, in accordance with some embodiments of the present disclosure, when the total parking period of the plurality of digital-channel-types is greater than the expected wait-time of the received query, the query may be resolved via the digital-channel-type that the query has been received.

Furthermore, in accordance with some embodiments of the present disclosure, the identified one or more similar pending queries may be queries of different customers.

Furthermore, in accordance with some embodiments of the present disclosure, the group-of-queries of each digital-channel-type may be stored in a group database related to the digital-channel-type.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Current systems in contact centers support various types of digital channels via which customers may approach the contact center. Commonly, when there is a resolution to a customer's query in a knowledge base, it is provided by a bot and not added to a channel type related queue. For example, when a customer approaches the contact center via email, a bot may respond to the query when the resolution is in the knowledge base or else the query is being added to the queue related to the digital-channel-type, e.g., email.

The same customer, or other customers may approach the contact center with the same query via the same digital-channel-type or other digital-channel-types, such as, social media messengers, text message, chat applications and the like, such as WhatsApp, WeChat, Instagram, Viber, Facebook, which may be responded, via a batch process, once one of the queries is resolved. Moreover, other digital-channel-types may be time-wise shorter than the digital-channel-type that the customer has approached the contact center, and an agent may be available to respond via the other channel or a similar query may be responded.

Existing solutions don't have a mechanism which park, e.g., redirect a query to other digital-channel-types, aggregate queries of the customer or other customers to another digital medium and send a response to all aggregated queries once a resolution is provided to a query from the aggregated queries via a batch process, thus providing a faster resolution.

Therefore, there is a need for method and system for reducing wait-time in a multichannel contact center by utilizing channel agnostic processing. The needed technical solution should implement the channel agnostic processing by aggregating similar queries for later on resolution via batch process and by redirecting the query to an alternate digital-channel-type for quick query resolution, while the response to the query is then provided to the customers via the original channel types.

Figure 1:
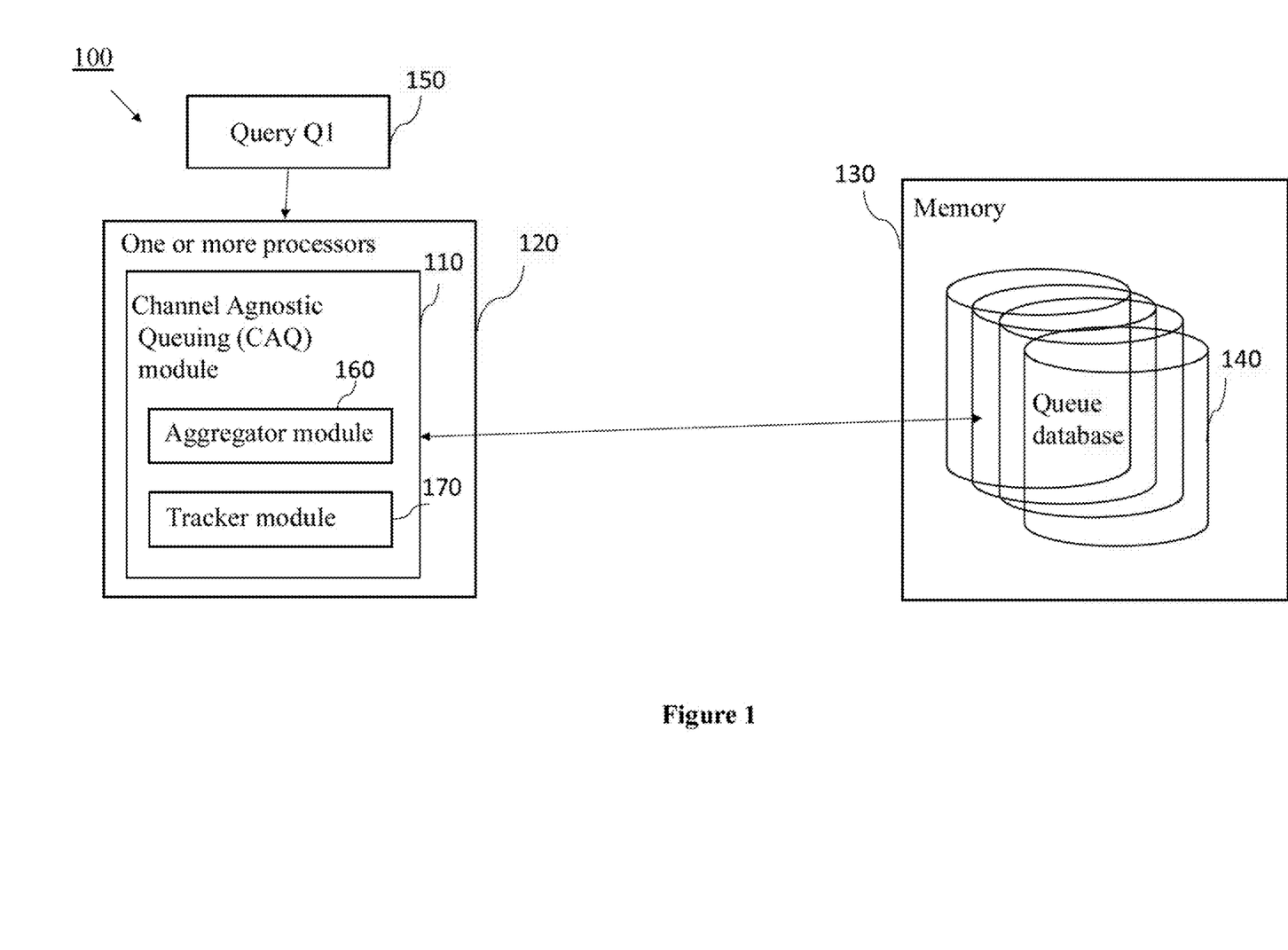
FIG. 1 schematically illustrates a high-level diagram of a system for reducing wait-time in a multichannel contact center, in accordance with some embodiments of the present disclosure.

FIG. 1 schematically illustrates a high-level diagram of a system 100 for reducing wait-time in a multichannel contact center, in accordance with some embodiments of the present disclosure.

According to some embodiments of the present disclosure, in a system, such as system 100, that is supporting inbound-interactions via a plurality of digital-channel-types, the system 100 may include: one or more processors 120, a plurality of queue-databases 140 having a queue-database for each digital-channel-type and a memory 130 to store the plurality of queue-databases 140 thereon.

According to some embodiments of the present disclosure, system 100 may utilize an aggregation of similar queries of various customers on a digital medium along with parking of the query on one or more digital-channel-types, i.e., waiting for resolution on the digital-channel-type. Once a similar query has been resolved on the parked digital-channel-type, it may be stored in a knowledge base for future references and also used as a resolution to be sent to multiple customers that have posted the same query, as a batch answer, at the same time.

Figure 2A:
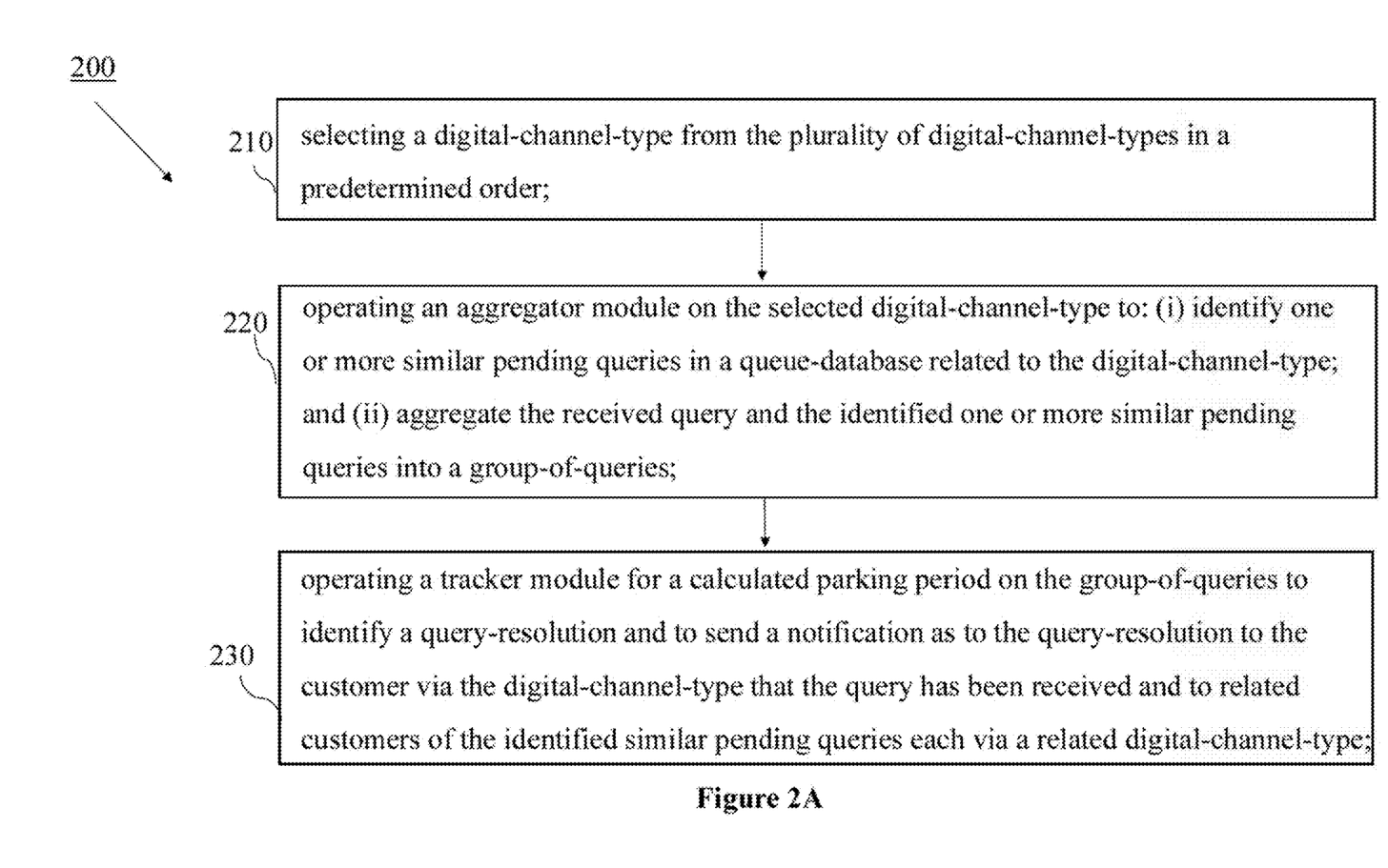
FIGS. 2A-2B are a high-level workflow of a Channel Agnostic Queuing (CAQ) module, in accordance with some embodiments of the present disclosure.
Figure 2B:
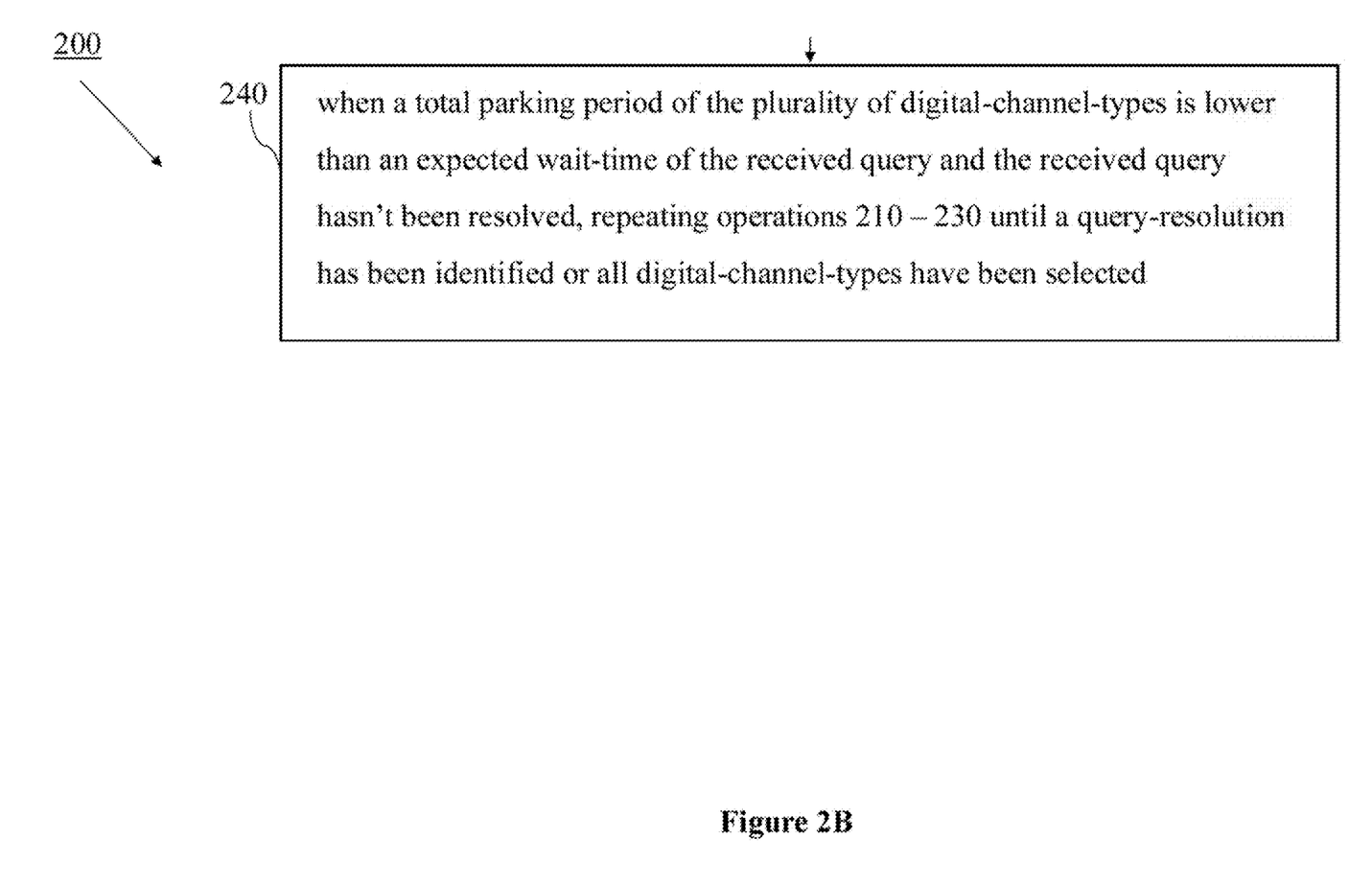

According to some embodiments of the present disclosure, for each query, such as query 'Q1' 150 that may be received by a customer via a digital-channel-type and not resolved by a bot, the one or more processors 120 may operate a module, such as Channel Agnostic Queuing (CAQ) module 110 and such as CAQ module 200 in FIGS. 2A-2B. For example, the digital-channel-type may be email, WhatsApp, Short Message Service (SMS) and the like. The query 'Q1' may be resolved by a bot when the solution to the query is stored in the knowledge base.

According to some embodiments of the present disclosure, the CAQ module 110 may include selecting a digital-channel-type from the plurality of digital-channel-types in a predetermined order. The predetermined order of the selecting of the digital-channel-type from the plurality of digital-channel-types may be configured to have a digital-channel-type via which the query has been received as first and then other digital-channel-types in ascending order based on a calculated parking period related to each digital-channel-type. The parking period may be the time that the query is redirected to the digital-channel-type.

According to some embodiments of the present disclosure, the received query, e.g., query 'Q1' 150, may be resolved via a digital-channel-type different from the first digital-channel-type by: (i) an agent of the digital-channel-type different from the first digital-channel-type; or (ii) a query of the group-of-queries in the digital-channel-type different from the first digital-channel-type has been resolved.

According to some embodiments of the present disclosure, the parking period in each digital-channel-type may be calculated by formula (IV):

$$\text{parking period}=\text{wait-time}/(C*Q) \qquad \text{(IV)}$$

whereby:
C is a number of digital-channel types, and
Q is queue size of a queue-database related to the digital-channel-type, and
wait-time is the expected wait-time of the received query.

According to some embodiments of the present disclosure, the expected wait-time of the received query is determined by formula III:

$$\text{wait-time}=\Sigma_{i=1}^{N-1} Q*Ti \qquad \text{(III)}$$

whereby:
T is a waiting period per query that is retrieved from the queue-database of the received query,
N−1 is a number of total queries which is ahead from the received query, and
Q is a queue size which is a number of queries in the queue-database of the received query.

According to some embodiments of the present disclosure, the CAQ module 110 may further include operating a module, such as an aggregator module 160 on the selected digital-channel-type to: (i) identify one or more similar pending queries in a queue-database related to the digital-channel-type; and (ii) aggregate the received query and the identified one or more similar pending queries into a group-of-queries. The identified one or more similar pending queries may be queries of different customers or of the same customer. The group-of-queries of each digital-channel-type may be stored in a group database related to the digital-channel-type. The group database may be a data store such as parking data store 610 in FIG. 6.

According to some embodiments of the present disclosure, the similar pending queries may be queries which are having a Query Similarity Score (QSS) above a predefined threshold.

According to some embodiments of the present disclosure, the QSS of each pending query may be calculated based on feature vectors which may be generated from processing sentences in the received query 150 and in the pending query. The processing may be operated by using at least one of Neuro Linguistic Programming (NLP) techniques to convert each query into a feature vector: (i) Term Frequency-Inverse Document Frequency (TF-IDF) methods; or (ii) word2Vec technique; or (iii) Smooth Inverse Frequency (SIF).

Figure 5A:
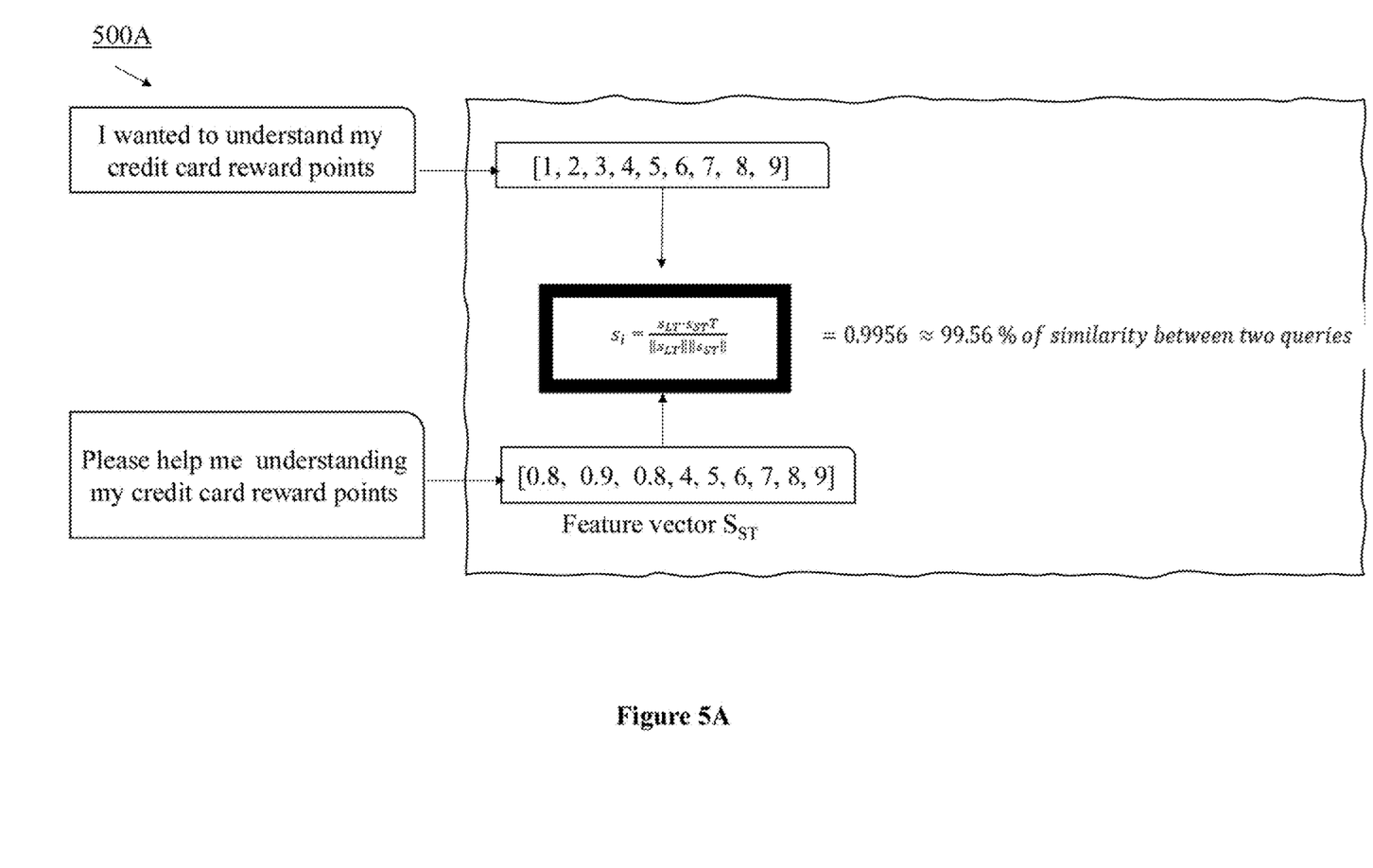
FIGS. 5A-5B illustrate a calculation of Query Similarity Score (QSS) by using Term Frequency-Inverse Document Frequency (TF-IDF) method, in accordance with some embodiments of the present disclosure.
Figure 5B:
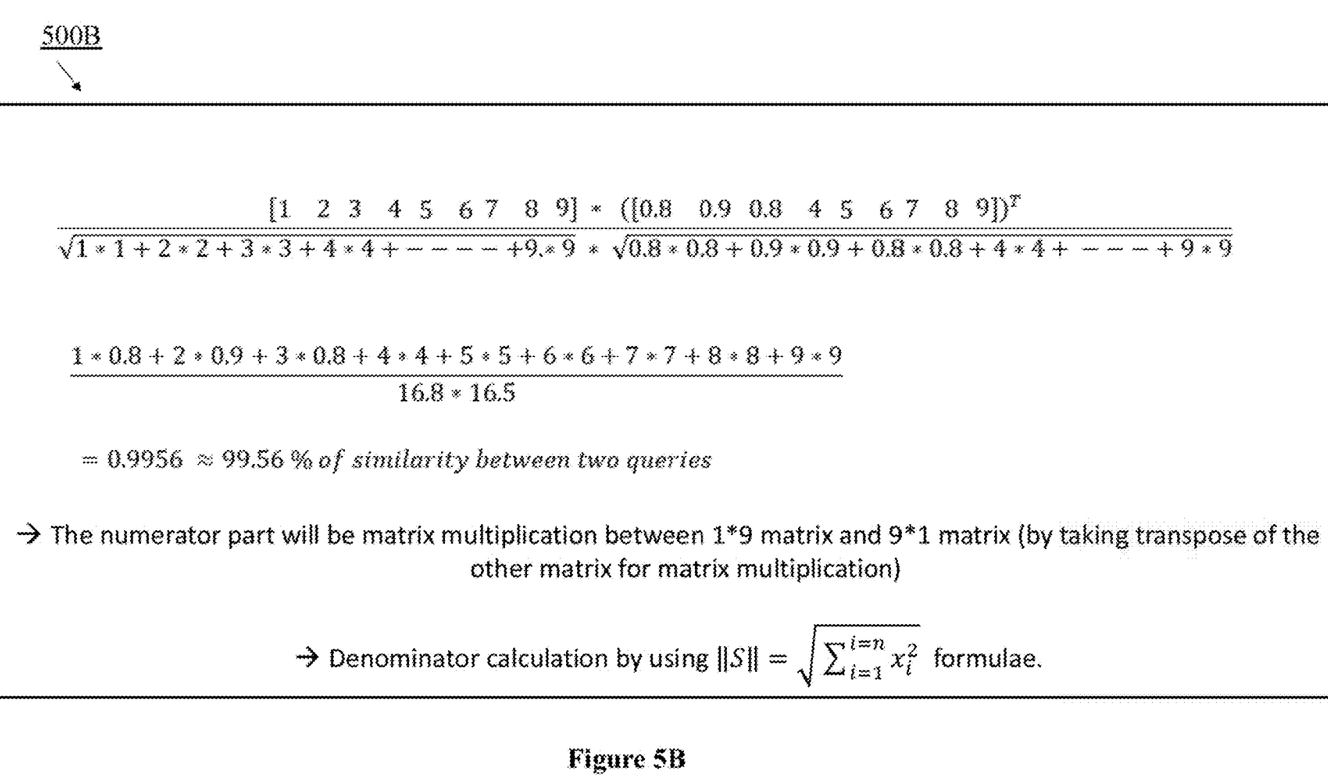

According to some embodiments of the present disclosure, when the used NLP technique is TF-IDF, the QSS of each pending query may be calculated, as shown in FIGS. 5A-5B, by formula I:

$$S_i = \frac{S_{LT} \cdot S_{ST}}{\|S_{LT}\| \|S_{ST}\|} \qquad \text{(I)}$$

whereby:
$S_i$ is a Query Similarity Score
$S_{LT}$ is a feature vector of the received query, and
$S_{ST}$ is a feature vector of a pending query.
$\|S_{LT}\|$ and $\|S_{ST}\|$ may be calculated based on formula II:

$$\|S\|=\sqrt{\Sigma_{i=1}^{i=n} x_i^2}$$

whereby: $x_i$ is an element from the feature vector.

According to some embodiments of the present disclosure, the CAQ module 110 may further include operating a module, such as tracker module 170 for a calculated parking period on the group-of-queries to identify a query-resolution and to send a notification as to the query-resolution to the customer via the digital-channel-type that the query has been received by and to related customers of the identified similar pending queries, each via a related digital-channel-type. The notification may be presented to the customer via a display unit that may be associated to a computerized device that operated the posting of the query via the digital-channel-type.

According to some embodiments of the present disclosure, the identifying of the query resolution by the tracker module 170 may include checking when at least one query of the group-of-queries has been resolved.

According to some embodiments of the present disclosure, when a total parking period of the plurality of digital-channel-types is lower than an expected wait-time of the received query and the received query hasn't been resolved, the CAQ module 110 may further include repeating the selecting of a digital-channel-type, the operating of the aggregator module 150 and then the operating of the tracker module 170 until a query-resolution may be identified or all digital-channel-types have been selected.

According to some embodiments of the present disclosure, the selecting of a digital-channel-type may be the digital-channel-type that the query has been received as first and then each digital-channel-type in ascending order based on a calculated parking period related to each digital-channel-type.

According to some embodiments of the present disclosure, the total parking period may be determined by aggregating the calculated parking period of each digital-channel-type in the plurality of digital-channel-types.

According to some embodiments of the present disclosure, in a non-limiting example, in case a query, such as query 'Q1' 150 has been posted in a digital channel, such as email channel and the expected wait-time of the email channel is lower than the total parking period of the other digital-channel-types, meaning, no parking mechanism is required after the operating of similar query aggregation.

According to some embodiments of the present disclosure, in such a case, when customer 'A1' has posted a query via email channel and the query is in progress and then customer 'A2' has posted a query via email channel and the query is second in the queue related to email channel, customer 'A3' has posted a query via email channel and the query is third in the queue related to email channel and customer 'A4' has posted the query, such as query 'Q1' 150 via email channel and the query is fourth in the queue related to email channel, a module, such as the aggregator module 160 may identify that the queries of customer 'A1' and customer 'A4' are similar and may aggregate the queries into a group-of-queries.

According to some embodiments of the present disclosure, once an agent is providing a query-resolution to customer 'A1', then a notification as to the query-resolution may be sent to related customers of the group-of-queries i.e., identified similar pending queries, each via a related digital-channel-type, e.g., customer 'A4' via the email channel.

According to some embodiments of the present disclosure, in yet another non-limiting example, when a query, such as query 'Q1' 150 has been posted in a digital channel, such as email channel and the total parking period of the other digital-channel-types, is lower than the expected wait-time of the email channel, meaning, parking mechanism may be required after similar query aggregation.

According to some embodiments of the present disclosure, in such a case, when customer 'A1' has posted a query via email channel and the query is in progress and then customer 'A2' has posted a query via email channel and the query is second in the queue related to email channel, customer 'A3' has posted a query via Facebook channel and the query is first in the queue related to Facebook channel and customer 'A4' has posted a query, such as query 'Q1' 150 via email channel and the query is third in the queue related to email channel, query 'Q1' 150 may be parked on the other digital-channel-types until a query-resolution has been identified or the parking period on the digital-channel-type has elapsed. When the query 'Q1' 150 is parking in each digital-channel-type, a module, such as the aggregator module 160 may be operated to identify queries which are similar to the query of customer 'A4', query 'Q1' 150, to aggregate the queries into a group-of-queries.

According to some embodiments of the present disclosure, when, query 'Q1' 150 is parking in Facebook messenger channel, then when the aggregator module 160 may identify that the queries of customer 'A3' and customer 'A4' are similar, it may be aggregated into a group-of-queries and when the parking period hasn't elapsed and a resolution for the query of customer 'A3' has been provided, a notification as to the query-resolution may be sent to the customer 'A4' via the digital-channel-type that the query has been received, e.g., email.

FIGS. 2A-2B are a high-level workflow of a Channel Agnostic Queuing (CAQ) module 200, in accordance with some embodiments of the present disclosure.

According to some embodiments of the present disclosure, operation 210 comprising selecting a digital-channel-type from the plurality of digital-channel-types in a predetermined order.

According to some embodiments of the present disclosure, operation 220 comprising operating an aggregator module on the selected digital-channel-type to: (i) identify one or more similar pending queries in a queue-database related to the digital-channel-type; and (ii) aggregate the received query and the identified one or more similar pending queries into a group-of-queries.

According to some embodiments of the present disclosure, operating a tracker module for a calculated parking period on the group-of-queries to identify a query-resolution and to send a notification as to the query-resolution to the customer via the digital-channel-type that the query has been received and to related customers of the identified similar pending queries each via a related digital-channel-type.

According to some embodiments of the present disclosure, when a total parking period of the plurality of digital-channel-types is lower than an expected wait-time of the received query and the received query hasn't been resolved, repeating operations 210-230, until a query-resolution has been identified or all digital-channel-types have been selected.

Figure 3:
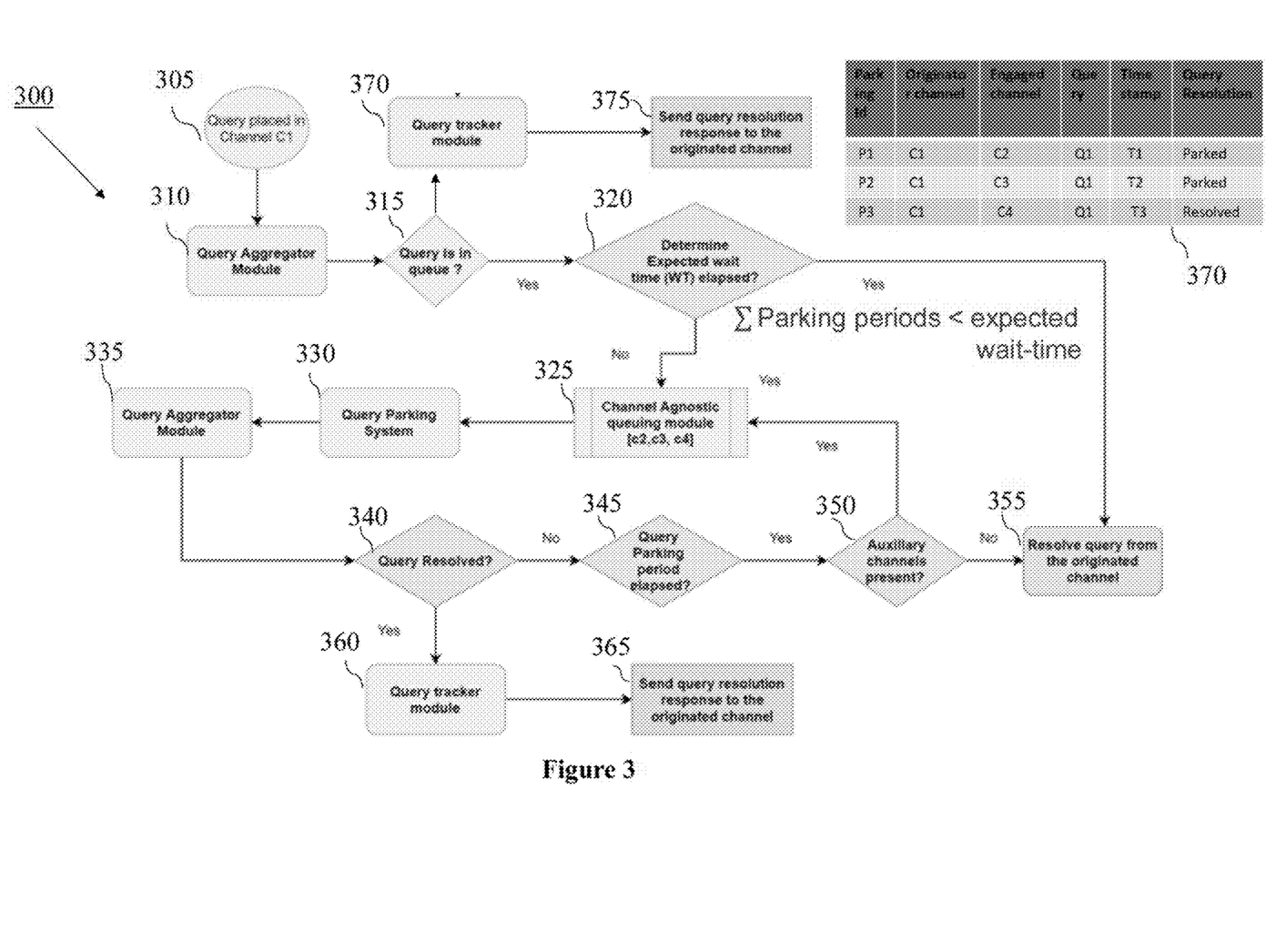
FIG. 3 is a workflow of a CAQ module, in accordance with some embodiments of the present disclosure.

FIG. 3 is a workflow of a Channel Agnostic Queuing (CAQ) module 300, in accordance with some embodiments of the present disclosure.

According to some embodiments of the present disclosure, when a query is placed on a digital channel 'C1' 305, e.g., email, a module, such as CAQ module 300 and such as CAQ module 200 in FIGS. 2A-2B may select the digital-channel-type, such as digital channel 'C1' and then may operate a module, such as a query aggregator module 310 and such as the aggregator module 160 in FIG. 1, to identify one or more similar pending queries in a queue-database related to digital channel 'C1' and to aggregate the received query and the identified one or more similar pending queries into a group-of-queries. The group-of-queries may be stored in a group database, such as parking datastore 610 in FIG. 6.

According to some embodiments of the present disclosure, CAQ module 300 may check if the query is in queue 315, e.g., if the query is in the queue of the digital channel 'C1', to confirm that the query hasn't been resolved by an agent in digital channel 'C1' or a similar query in the group-of-queries has been resolved. The queue may be a queue database related to digital channel 'C1' which is a queue database in a plurality of queue databases having a queue-database for each digital-channel-type, such as the plurality of queue databases 140 in FIG. 1.

According to some embodiments of the present disclosure, when the query is not in the queue, e.g., the query is in progress, the CAQ module 300 may operate a module, such as a query tracker module 370 and such as the tracker module 170 in FIG. 1, on the group-of-queries to identify a query-resolution and to send a notification as to the query-resolution to the customer, via digital channel 'C1' and to related customers of the identified similar pending queries each via digital channel 'C1' 375.

According to some embodiments of the present disclosure, when the query is in the queue, CAQ module 300 may determine the expected wait-time of the received query in digital channel 'C1'. The expected wait-time of the received query may be determined by formula III:

$$\text{wait-time} = \Sigma_{i=1}^{N-1} Q * Ti \qquad (III)$$

whereby:
T is a waiting period per query that is retrieved from the queue-database of the received query,
N−1 is a number of total queries which is ahead of queue from the received query, and
Q is a queue size which is a number of queries in the queue-database of the received query.

According to some embodiments of the present disclosure, when the expected wait-time of the received query in digital channel 'C1' has elapsed 320, the query may be resolved via the original channel, e.g., digital channel 'C1' 355 by an agent.

According to some embodiments of the present disclosure, when a total parking period of the plurality of digital-channel-types is lower than the expected wait-time of the received query and the received query hasn't been resolved, the CAQ module 300 may be operated on the plurality of digital-channel-types 325, e.g., channel types 'C2', 'C3' and 'C4', in ascending order, based on a calculated parking period related to each digital-channel-type.

According to some embodiments of the present disclosure, the parking period in each digital-channel-type is calculated by formula (IV):

$$\text{parking period} = \text{wait-time}/(C*Q) \qquad (IV)$$

whereby:
C is a number of digital-channel types, and
Q is queue size of a queue-database related to the digital-channel-type, and
wait-time is the expected wait-time of the received query.

According to some embodiments of the present disclosure, for each digital-channel-type the query parking system 330 may operate a module, such as query aggregator module 335 and such as aggregator module 160 to: (i) identify one or more similar pending queries in a queue-database related to the digital-channel-type; and (ii) aggregate the received query and the identified one or more similar pending queries into a group-of-queries.

According to some embodiments of the present disclosure, for each digital-channel-type, the CAQ module 300 may operate a module, such as the query tracker module 360 and such as the tracker module 170 in FIG. 1, for a calculated parking period, on the group-of-queries to identify a query-resolution 340 and once a query-resolution has been identified to send a notification as to the query-resolution to the customer via the digital-channel-type that the query has been received 365 and to related customers of the identified similar pending queries.

According to some embodiments of the present disclosure, when a query-resolution hasn't been identified and the parking period elapsed, the CAQ module 300 may check the total parking period of the remaining digital-channel-types and if it is lower than the expected wait-time of digital channel 'C1' then the CAQ module 300 may operate on the next digital-channel-type, having the shortest parking period.

According to some embodiments of the present disclosure, for example, the parking period of 'C4' may be the shortest, then 'C2' and then 'C3'. When the calculated parking period has elapsed, and the tracker module didn't identify a query-resolution 345 then the CAQ module 300 may check that the sum of the total parking period of the remaining parking periods is less than the expected wait-time and may operate on the next digital-channel-type 350, as shown by table 370. When the CAQ module 300 have operated on all the digital-channel-types or if the expected waiting time on the original channel to resolve the query has elapsed, then the query may be resolved via the original channel 355, e.g., digital channel 'C1'.

According to some embodiments of the present disclosure, for example, after the parking period of digital-channel 'C4' has elapsed and no resolution to the query has been found, then the sum of the total parking period of the remaining parking periods e.g., 'C2', 'C3' is less than the expected wait-time and may operate on the next digital-channel-type 350, e.g., 'C2'.

Figure 4A:
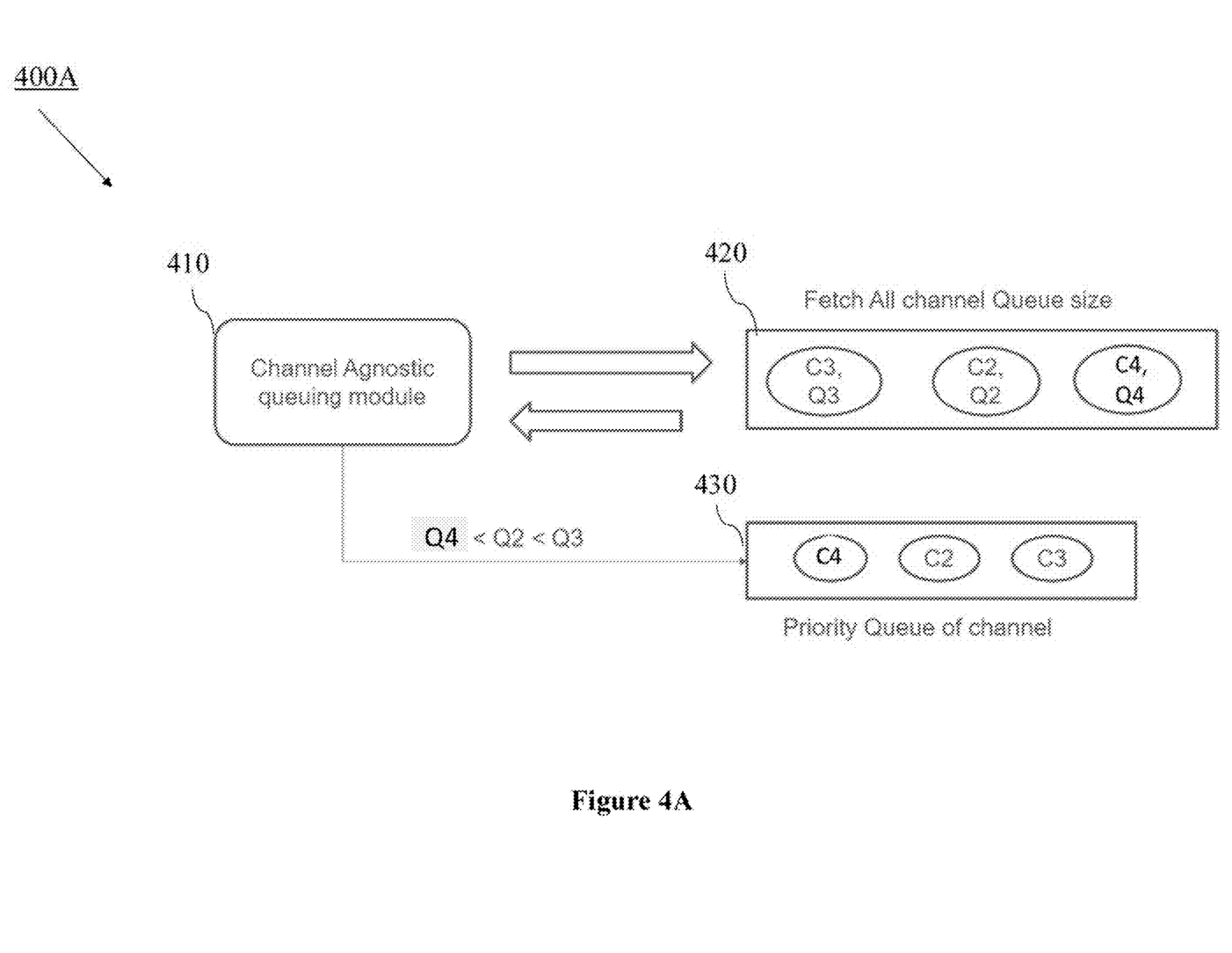
FIGS. 4A-4C schematically illustrate a plurality of digital-channel-types, in accordance with some embodiments of the present disclosure.
Figure 4B:
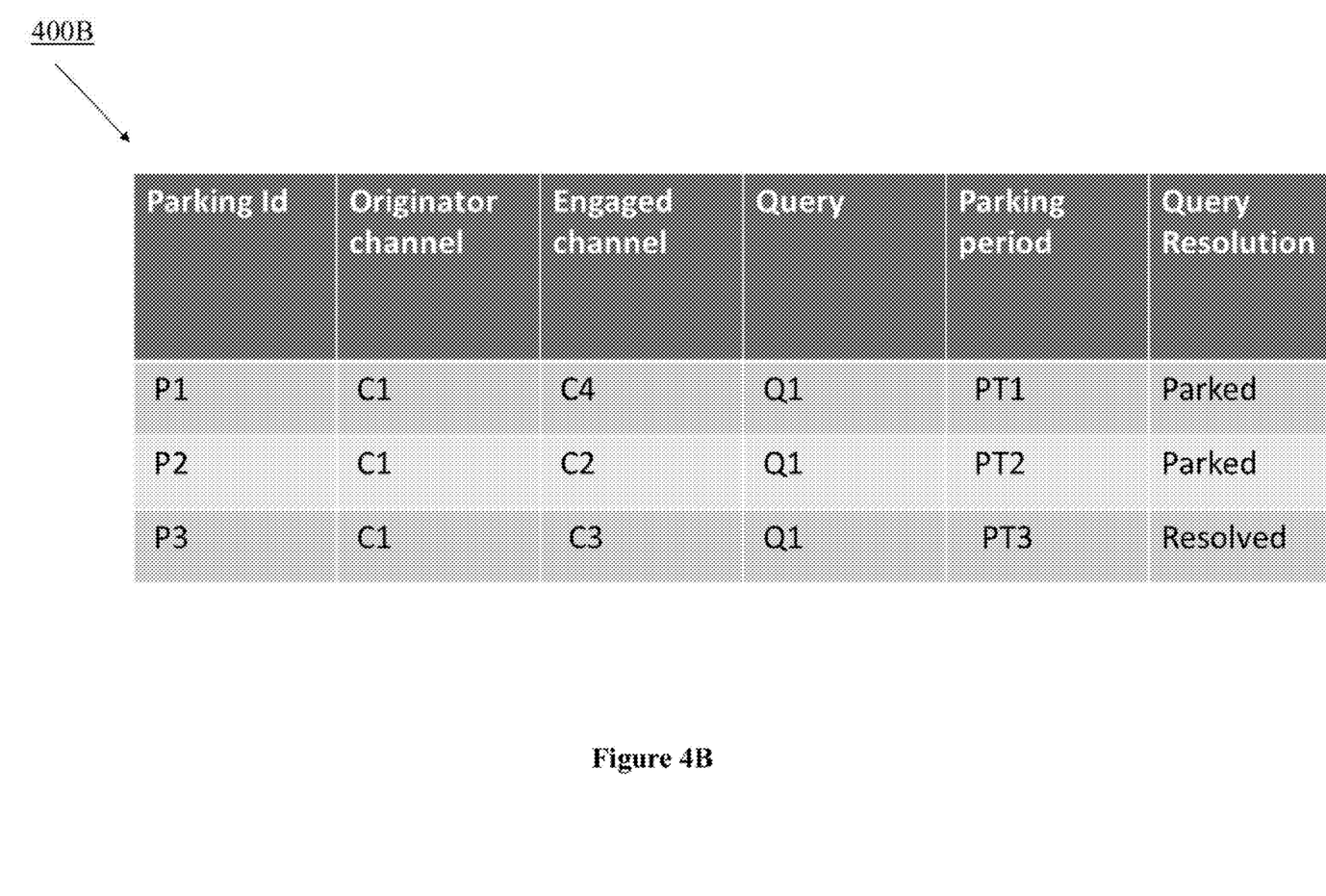
Figure 4C:
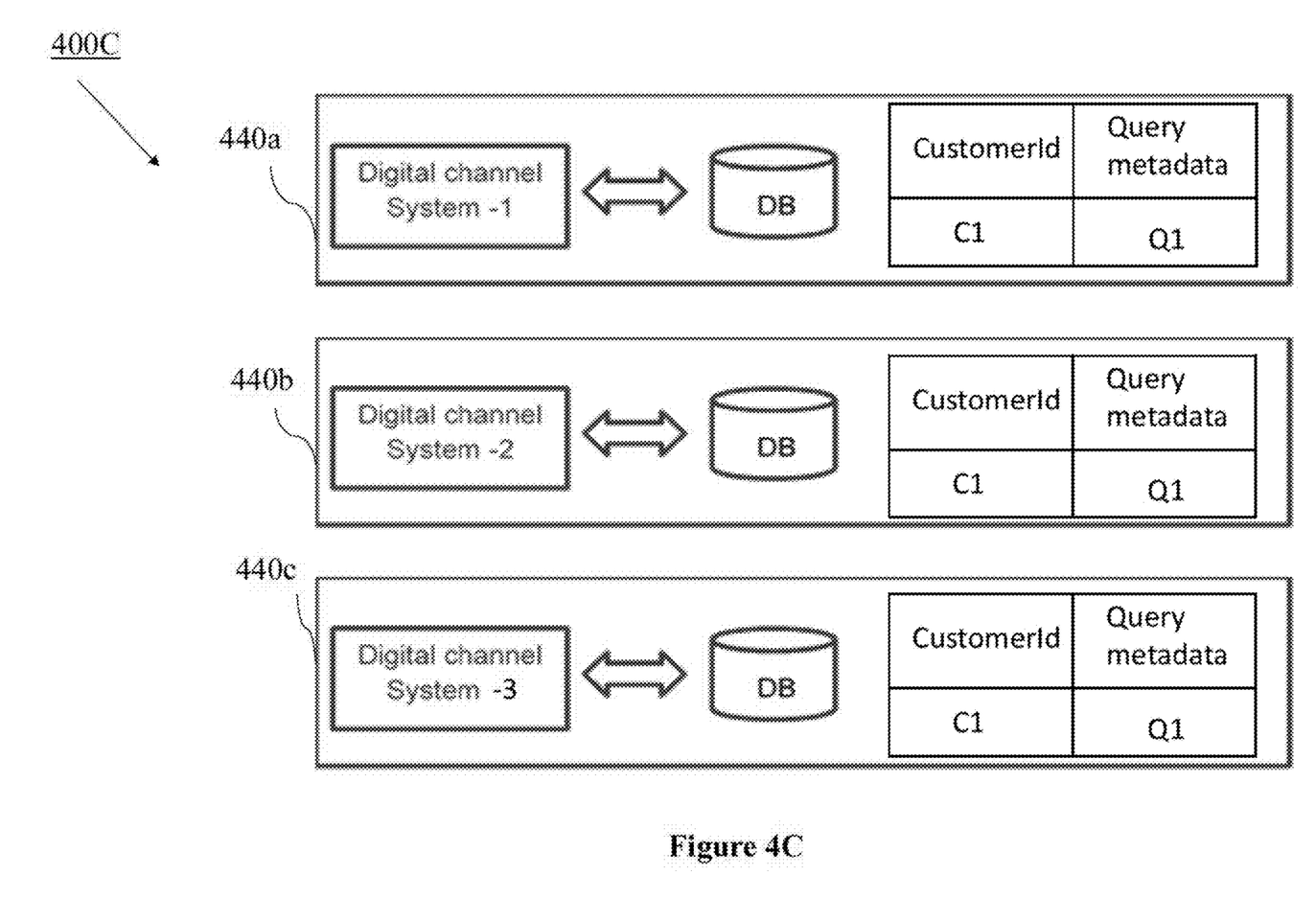

FIGS. 4A-4C schematically illustrate a plurality of digital-channel-types, in accordance with some embodiments of the present disclosure.

According to some embodiments of the present disclosure, in a system, such as system 100 in FIG. 1, there may be a plurality of queue-databases 140 in FIG. 1 having a queue-database for each digital-channel-type. Each digital-channel-type in the plurality of digital-channel-types 420 may be calculated a parking period, based on the queue size by a module, such as Channel Agnostic Queuing (CAQ) module 410, such as CAQ module 110 in FIG. 1 and such as CAQ module 300 in FIG. 3.

According to some embodiments of the present disclosure, the parking period in each digital-channel-type is calculated by formula (IV):

$$\text{parking period} = \text{wait-time}/(C*Q) \qquad (IV)$$

whereby:
C is a number of digital-channel types, and
Q is queue size of a queue-database related to the digital-channel-type, and
wait-time is the expected wait-time of the received query.

According to some embodiments of the present disclosure, the plurality of digital-channel-types may be organized in a predetermined order, e.g., ascending order, based on the calculated parking period related to each digital-channel-type 430.

According to some embodiments of the present disclosure, when the total parking period of the plurality of digital-channel-types 430 is lower than an expected wait-time of the digital-channel-type of the received query and a query in the group of queries hasn't been resolved, e.g., the received query hasn't been resolved, the received query may be parked on each queue of the digital-channel-types, in ascending order 430, e.g., 'C4', 'C2' and 'C3'.

According to some embodiments of the present disclosure, for example, as shown in table 400B, when a query is received via digital-channel-type 'C1' and the total parking period of digital-channel-types 'C2', 'C3', and 'C4' is lower than the expected wait-time of digital-channel-type 'C1', then when there are no similar queries in digital channel 'C1', each digital-channel-type of digital-channel-types 'C2' 'C3', and 'C4' may be calculated and the received query may be parked on each digital-channel-type in ascending order, as shown in FIG. 4C by elements 440a-440c, based on a calculated parking period related to each digital-channel-type, till the query may be resolved by an agent via the digital-channel-type or the parking period related to the digital-channel-type elapses.

According to some embodiments of the present disclosure, as shown in table 400B, after parking on digital-channels 'C4' for the related parking period and no resolution has been identified and parking on digital-channel 'C2' for the related parking period and no resolution has been identified, the CAQ module 410 may operate on digital-channel 'C3', and when one of the queries in the group-of-queries has been resolved, a notification may be sent to the customer via digital-channel 'C1' and to the other customers of the queries in the group-of-queries via digital-channel 'C3'.

FIG. 5A-5B illustrate a calculation of Query Similarity Score (QSS) by using Term Frequency-Inverse Document Frequency (TF-IDF) method, in accordance with some embodiments of the present disclosure.

According to some embodiments of the present disclosure, similar pending queries may be queries which are having a Query Similarity Score (QSS) above a predefined threshold.

According to some embodiments of the present disclosure, a customer may post a query, such as "I want to understand my credit card reward points". When the NLP technique that is used to calculate a QSS is TF-IDF, the query may be converted into a feature vector, $S_{LT}$, such as [1,2,3,4,5,6,7,8,9]. The query may be compared to a pending query in the queue, such as "Please help me understanding my credit card reward points", which may be converted into a feature vector, $S_{ST}$, such as [0.8,0.9,0.8,4,5,6,7,8,9]. Accordingly, the QSS of a pending query may be calculated by formula I:

$$S_i = \frac{S_{LT} \cdot S_{ST}T}{\|S_{LT}\|\|S_{ST}\|} \quad (I)$$

whereby:
$S_i$ is Query Similarity Score
$S_{LT}$ is a feature vector of the received query,
$S_{ST}$ is a feature vector of a pending query, and
T denotes the transpose of the feature vector of a pending query,
$\|S_{LT}\|$ and $\|S_{ST}\|$ are calculated based on formula II:

$$\|S\| = \sqrt{\Sigma_{i=1}^{i=n} x_i^2} \text{ where } x_i \text{ is an element from feature vector.} \quad (II)$$

According to some embodiments of the present disclosure, based on formula I, the QSS of the pending query may be, 0.9956, as shown in example, 500B.

Figure 6:
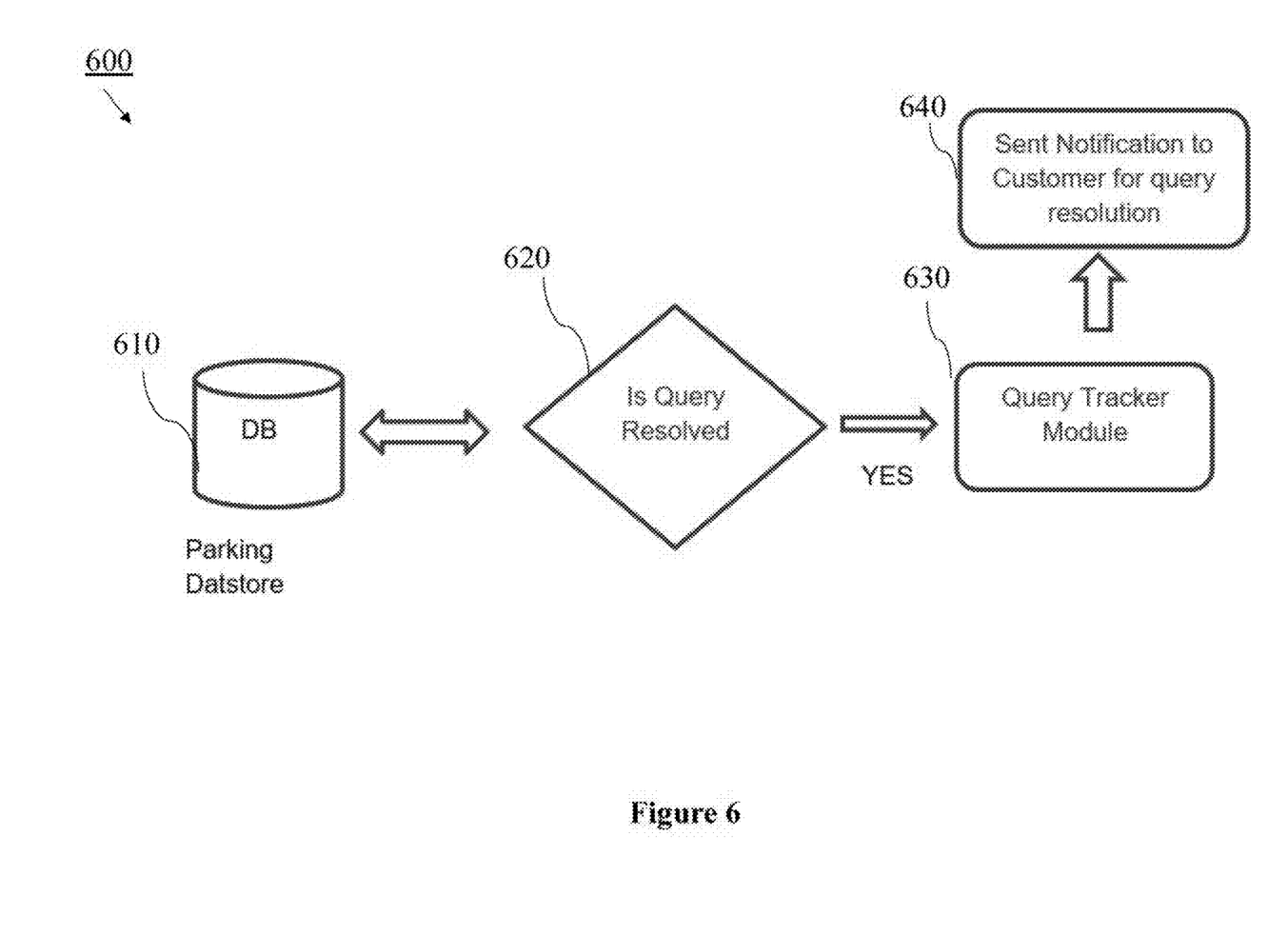
FIG. 6 is a workflow of a tracker module, in accordance with some embodiments of the present disclosure.

FIG. 6 is a workflow of a tracker module 600, in accordance with some embodiments of the present disclosure.

According to some embodiments of the present disclosure, a module, such as query tracker module 630 and such as tracker module 170 in FIG. 1 and such as query tracker module 360 and 370 in FIG. 3 may be operated for a calculated parking period on a group-of-queries, which may be stored in a data store, such as parking datastore 610 to check if query is resolved 620 e.g., to identify a query-resolution and to send a notification as to the query-resolution to the customer via the digital-channel-type that the query has been received and to related customers of the identified similar pending queries each via a related digital-channel-type 640.

According to some embodiments of the present disclosure, each customer may receive the query-resolution, e.g., notification via the digital-channel type that the customer has approached the contact center.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for reducing wait-time in a multichannel contact center, said computerized-method comprising: receiving a plurality of queries that are received via a digital-channel type, wherein the plurality of queries including queries that are not resolved by a bot; for each query received from a customer via a digital-channel-type and not resolved by a bot, a. selecting a digital-channel-type from a plurality of digital-channel-types; b. operating an aggregator module on the selected digital-channel-type to aggregate the received query and one or more similar pending queries into a group-of-queries; wherein the similar pending queries are queries which are having a Query Similarity Score (QSS) above a predefined threshold; c. operating a tracker module for a calculated parking period on the group-of-queries to identify a query-resolution and to send a notification as to the query-resolution to the customer via the digital-channel-type that the query has been received; and d. repeating steps a.-c. until a query-resolution has been identified or all digital-channel-types in the plurality of digital-channel-types have been selected.

2. The computerized-method of claim 1, wherein the one or more similar pending queries are identified by the aggregator module in a queue-database related to the digital-channel-type.

3. The computerized-method of claim 1, wherein the tracker module is further sending the notification as to the query-resolution to related customers of the identified similar pending queries, each via a related digital-channel-type.

4. The computerized-method of claim 1, wherein the repeating of steps a.-c. is when a total parking period of the plurality of digital-channel-types is lower than an expected wait-time of the received query and the received query hasn't been resolved.

5. The computerized-method of claim 1, wherein the predetermined order of the selecting of the digital-channel-type from the plurality of digital-channel-types is configured to have a digital-channel-type that the query has been received as first and then other digital-channel-types in ascending order based on a calculated parking period related to each digital-channel-type.

6. The computerized-method of claim 5, wherein the total parking period is determined by aggregating the calculated parking period of each digital-channel-type in the plurality of digital-channel-types.

7. The computerized-method of claim 5, wherein the received query is resolved via a digital-channel-type different from the first digital-channel-type by: (i) an agent of the digital-channel-type different from the first digital-channel-type; or (ii) a query of the group-of-queries in the digital-channel-type different from the first digital-channel-type has been resolved.

8. The computerized-method of claim 5, wherein the parking period in each digital-channel-type is calculated by formula (IV):

parking period=wait-time/($C*Q$)     (IV)

whereby:
C is a number of digital-channel types, and
Q is queue size of a queue-database related to the digital-channel-type, and
wait-time is the expected wait-time of the received query.

9. The computerized-method of claim 1, wherein the identifying of the query resolution by the tracker module comprising: checking when at least one query of the group-of-queries has been resolved.

10. The computerized-method of claim 1, wherein the QSS of each pending query is calculated based on feature vectors which are generated from processing sentences in the received query and in the pending query, and wherein the processing is operated by using at least one of Neuro Linguistic Programming (NLP) techniques to convert each query into a feature vector: (i) Term Frequency-Inverse Document Frequency (TF-IDF) methods; or (ii) word2Vec technique; or (iii) Smooth Inverse Frequency (SIF).

11. The computerized-method of claim 10, wherein when the NLP technique is TF-IDF, the QSS of each pending query is calculated by formula I:

$$S_i = s_{LT} \cdot s_{ST} / \|s_{LT}\| \|s_{ST}\|$$     (I)

whereby:
$S_i$ is Query Similarity Score,
$S_{LT}$ is a feature vector of the received query,
$S_{ST}$ is a feature vector of a pending query, and
$\|S_{LT}\|$ and $\|S_{ST}\|$ are calculated based on formula II:

$$\|S\| = \sqrt{\Sigma_{i=1}^{i=n} x_i^2}$$ where $x_i$ is an element from feature vector.

12. The computerized-method of claim 1, wherein the expected wait-time of the received query is determined by formula III:

$$\text{wait-time} = \Sigma_{i=1}^{N-1} Q*Ti$$     (III)

whereby:
T is a waiting period per query that is retrieved from the queue-database of the received query,
N−1 is a number of total queries which is ahead of queue from the received query, and
Q is a queue size which is a number of queries in the queue-database of the received query.

13. The computerized-method of claim 1, wherein when the total parking period of the plurality of digital-channel-types is greater than the expected wait-time of the received query, the query is resolved via the digital-channel-type that the query has been received.

14. The computerized-method of claim 1, wherein the identified one or more similar pending queries are queries of different customers.

15. The computerized-method of claim 1, wherein the group-of-queries of each digital-channel-type is stored in a group database related to the digital-channel-type.

* * * * *